United States Patent [19]

Cale, Jr.

[11] Patent Number: 4,531,665
[45] Date of Patent: Jul. 30, 1985

[54] METHOD OF MANUFACTURING CLEVIS END CONNECTING ROD

[76] Inventor: Roland E. Cale, Jr., 732 Lakeview Ave., Cortland, Ohio 44410

[21] Appl. No.: 476,591

[22] Filed: Mar. 18, 1983

[51] Int. Cl.³ .................................................. B23P 15/00
[52] U.S. Cl. .................................... 228/170; 403/157; 29/175 A
[58] Field of Search ................ 228/170; 403/270, 271, 403/272, 157, 158, 159, 43, 44, 45, 46, 47, 48, 79; 188/52, 219.1; 105/176; 29/175 A, 415, 416, DIG. 20

[56] References Cited

U.S. PATENT DOCUMENTS

| | | | |
|---|---|---|---|
| 607,596 | 7/1898 | Baker | 403/157 |
| 635,288 | 10/1899 | Barret | 29/415 |
| 740,865 | 10/1903 | Jenkins | 29/175 A |
| 1,699,546 | 1/1929 | Scheibli | 29/175 A |
| 1,708,115 | 4/1929 | Baldwin | 29/416 |
| 2,696,998 | 12/1954 | Roby | 403/157 |
| 4,159,187 | 6/1979 | Cale | 403/272 |
| 4,196,642 | 4/1980 | Cale | 29/175 A |
| 4,414,726 | 11/1983 | Cale | 228/160 |
| 4,444,350 | 4/1984 | Crummett | 228/112 |

Primary Examiner—Kenneth J. Ramsey
Assistant Examiner—M. Jordan
Attorney, Agent, or Firm—Carothers & Carothers

[57] ABSTRACT

A clevis end connecting rod such as a truck lever connection rod, brake cylinder push rod, brake rod end, etc., utilized on railroad cars and the like, is manufactured by forming a piece of straight metal bar stock with a central offset and then transversely severing the bar stock at the central portion of the offset and then realigning the severed bar ends with each other to form a bifurcated jaw having laterally spaced side portions merging to contact at their offset ends with their surfaces of severance lying in a common plane. One end of an elongated piece of metal stock is butted up against the severed end surfaces and there welded. Aligned bores are provided in the bifurcated arms to receive a common connecting pin therethrough. Alternatively, the bar stock formed with the central offset may be transversely severed at a predetermined angle relative to the free end of the bar, and a straight piece of metal stock is also severed at the same angle and a severed piece of the offset stock is aligned with the severed piece of straight stock to form a bifurcated jaw having laterally spaced parallel side portions with the offset of the severed piece of the offset stock converging to contact the severed end of the piece of straight stock with their surfaces of severance aligned such that they are lying in a common plane. The elongated piece of metal stock is then butted up against these aligned severed end surfaces and welded.

10 Claims, 6 Drawing Figures

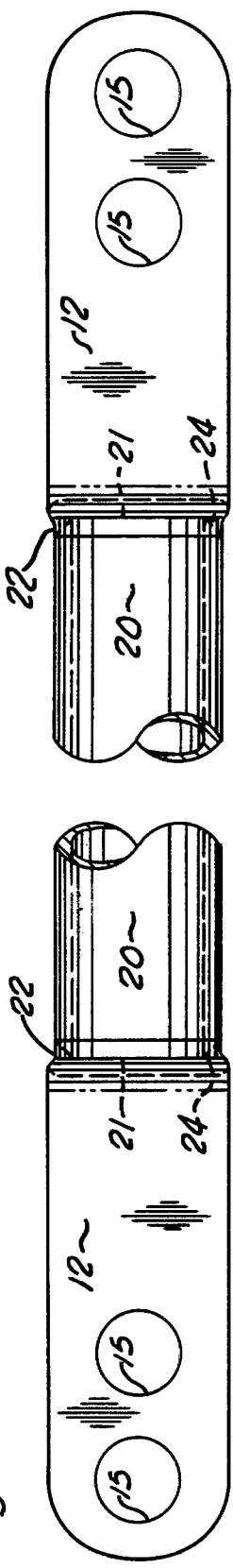
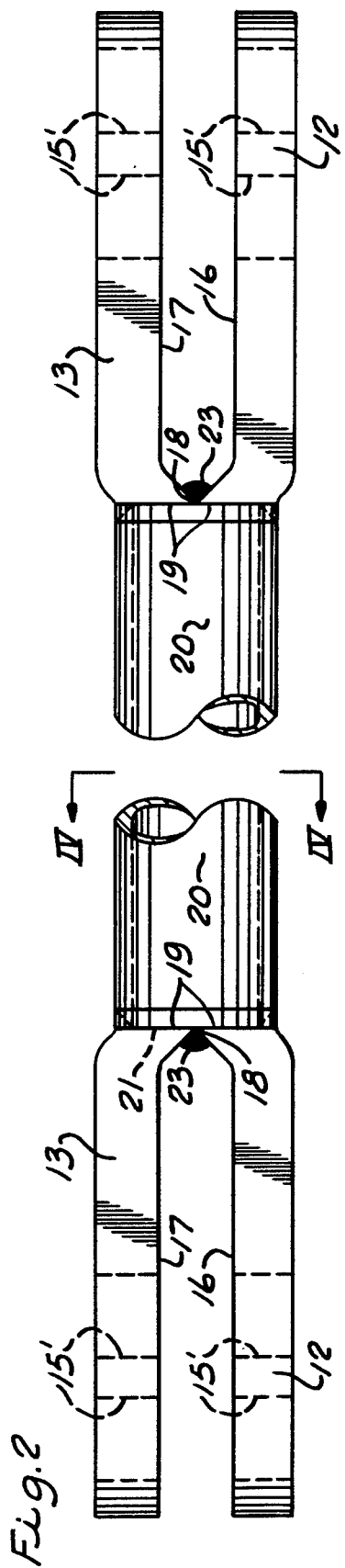
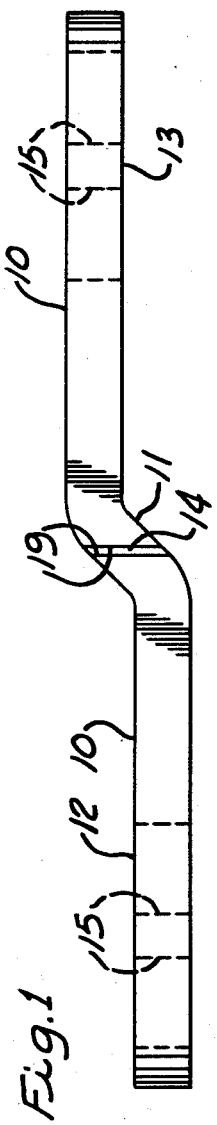
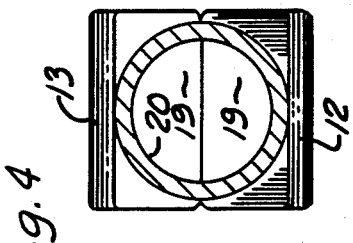

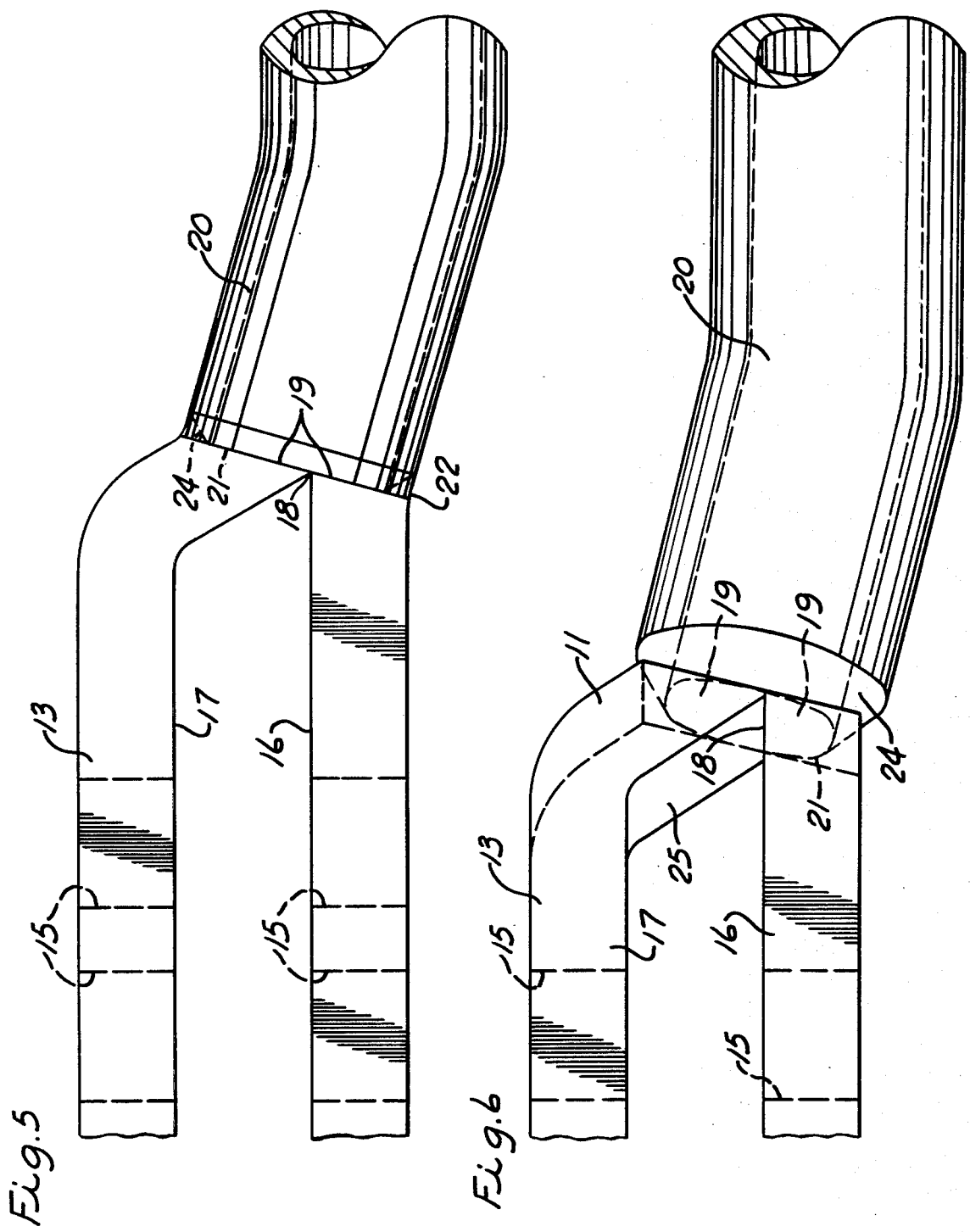

METHOD OF MANUFACTURING CLEVIS END CONNECTING ROD

BACKGROUND OF THE INVENTION

The present invention relates generally to a method of manufacturing a clevis end connecting rod.

In railroad car trucks, the use of a number of different clevis end connecting rods is required, particularly for the braking mechanism and brake linkage. For example, truck lever connection rods, brake cylinder push rods, and brake rod ends are required for interconnecting the brake linkage. All of these rods have a clevis end at at least one end of the connecting rods, which is bifurcated and has spaced aligned holes for connection to another linkage member. Some of the clevis ends are provided with a plurality of spaced transverse clevis pin holes or bores to permit adjustable clevis pin connection for different required lengths of connecting rods in the linkage system.

These brake rods and connections are generally manufactured or fabricated by hot drop forge techniques. In other words, the clevis end of the rods are formed from enlarged ends of a basic metal rod by forging techniques. This provides a very adequate and strong clevis end brake rod or connecting rod; however, the method of manufacture with hot forging techniques is extremely expensive and energy consuming.

Other methods of manufacturing such brake rods or connecting rods by welding techniques are illustrated in U.S. Pat. No. 4,159,187 and in my co-pending patent application Ser. No. 283,945 filed July 16, 1981 now U.S. Pat. No. 4,414,726 issued on Nov. 15, 1983.

It is a principal object of the present invention to manufacture a clevis end brake rod or connecting rod strictly by cold working techniques, with the exception of welding, to provide a less expensive brake rod or connecting rod which is equally strong as the prior art members, and to further provide a method for so doing which permits easy manufacture of such rods which have compound ends or curvatures which are generally required in order to have the rod attain operating clearance in relation to adjacent obstructions.

SUMMARY OF THE INVENTION

A metal rod connecting member having at least one bifurcated clevis end with aligned transverse bores to receive a connecting or clevis pin therethrough is manufactured in accordance with the teachings of the method of the present invention by forming a piece of straight metal bar stock with a central offset thereby providing parallel free bar ends extending off in opposite directions and then transversely severing this bar stock at the central portion of the offset on a plane perpendicular to the parallel free ends of the formed bar stock. Then the severed bar ends are realigned with each other to form a bifurcated jaw having laterally spaced parallel side portions merging to contact at their offset ends with their surfaces of severance lying in a common plane. Then an end of an elongated piece of metal stock is butted up against the severed end surfaces of the severed bar ends and welded.

This method thus described, provides for the manufacture of a clevis end with no overall offset, unless an offset is otherwise provided in the elongated stock which is welded to the clevis end. In situations where it is desired to provide an offset right at the clevis end of the rod, an alternative form of the method of the present invention is carried out wherein instead of transversely severing the initial piece of bar stock which is formed with a central offset perpendicular to the parallel free ends thereof, the central portion of the offset is severed at a predetermined angle measured relative to the free ends. Then a straight piece of metal bar stock is severed at this same predetermined angle and a severed piece of the offset stock is aligned with a severed piece of the straight stock to form the bifurcated jaw with the offset of the severed piece of the offset stock converging to contact the severed end of the severed piece of straight stock, such that their surfaces of severance are aligned to lie in a common plane. Then one end of the elongated piece of metal stock is butted up against these two aligned severed end surfaces and welded. Thus, the elongated piece of metal stock progresses away from the clevis end at an angle, thereby providing an offset in the connecting rod at the clevis end.

Sometimes it is desired that the end of the elongated metal stock which is welded to the clevis end be welded to the clevis end with a compound angle, such that the welded end of the elongated metal stock progresses away from the clevis end at both a horizontal and a vertical angle relative to the clevis end in order to provide a compound offset at the clevis end of the connecting rod. This can be accomplished not only by selecting the predetermined angle of severance of the clevis end arms, but can be further controlled by forming the transverse ends of the originally-formed piece of straight metal bar stock at angles other than perpendicular to the bar stock in order to form the central offset with a twist. This twist in the offset can thus provide maximum face exposure at its surface of central severance for welding to the elongated connecting rod or metal stock end.

Aligned bores are provided through the clevis end either before or after the step of severing for receiving a common connecting pin therethrough.

Where possible, it is also preferable to annularly taper the butting end of the elongated piece of stock prior to welding it to the severed surfaces of the clevis end in order to provide an annular welding relief. This provides a stronger welding connection.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a plan view of a piece of formerly straight metal bar stock which has been formed with a central offset and transversely severed at the central portion of the offset in order to illustrate the initial method step of the present invention.

FIG. 2 is a plan view of a clevis end connecting rod manufactured in accordance with the teachings of the present invention and utilizing therein both severed ends of the bar stock shown in FIG. 1.

FIG. 3 is a view in side elevation of the metal rod connecting member illustrated in FIG. 2.

FIG. 4 is an end vertical section view of the metal rod connecting member shown in FIG. 2 and as seen along section line IV—IV.

FIG. 5 is a plan view of one clevis end of a metal rod connecting member with an offset in one direction and manufactured in accordance with the teachings of the method of the present invention.

FIG. 6 is a plan view of one end of a clevis end metal rod connecting member having a compound offset and manufactured in accordance with the teachings of the present invention.

DETAILED DESCRIPTION OF THE PREFERRED EMBODIMENTS

Referring to FIG. 1, this Figure represent the first method step carried out toward the manufacture of a metal rod connecting member having a bifurcated clevis end in accordance with the teachings of the method of the present invention. First, an originally-straight piece of metal bar stock 10 is formed by any conventional means such as stamping or forming with a central offset 11 thereby providing parallel free bar ends 12 and 13 extending off in opposite directions. Bar stock 10 is severed by any conventional techniques such as sawing, as indicated at 14 at the central portion of offset 11 on a plane perpendicular to the parallel free ends 12 and 13, thereby providing separate severed bar ends 12 and 13.

Initial clevis pin openings 15 are cold punched through bar ends 12 and 13.

Then, referring to the left-hand side of FIGS. 2 and 3, and also to FIG. 4, severed bar ends 12 and 13 are re-aligned with each other to form the bifurcated jaw best illustrated in the left-hand side of FIG. 2, having laterally spaced parallel side portions 16 and 17 converging or merging to contact at 18, at their offset ends with their surfaces 19 of severances lying in a common vertical plane.

End 21 of elongated metal stock 20 is butted up against the severed end surfaces 19 of the severed bar ends 12 and 13 and there annularly welded as indicated at 22. Weld 23 is also provided along the straight line seam formed at 18 between severed bar ends 12 and 13. Holes 15 are reamed out as indicated at 15' to receive a clevis pin through the aligned holes in arms 12 and 13, and the construction of the clevis end is completed.

In the same fashion, the method is repeated, and a clevis end is formed at the opposite end of elongated metal stock 20 as illustrated at the right-hand side of FIGS. 2 and 3.

Opposite ends of elongated metal stock 20 are also annularly beveled or tapered as indicated at 24 to provide an annular welding relief to strengthen the weld, which may be used in compression or tension.

Elongated metal stock 20 is here illustrated as tubular metal stock. However, other metal stock will suffice, such as solid bar stock or angle stock. With angle stock, one piece of angle stock may be utilized, or preferably two pieces of elongated angle stock may be utilized and welded together to form tubular stock.

The clevis end metal rod connecting member shown in FIGS. 2 through 4 is manufactured to be a straight connecting rod. However, it is often required that the elongated member 20 of the connecting rod have offsets in order to clear or pass around obstructions. The method of the present invention may also be utilized to manufacture such connecting rods with offsets either in the horizontal direction, the vertical direction, or with offsets both in the horizontal and vertical directions. The former is illustrated in FIG. 5, and the latter is illustrated in FIG. 6.

Referring to FIG. 5, similar elements are indicated with the same reference numerals, and elongated metal stock 20 here connects to the clevis end made up of arms 16 and 17 at an offset, which is here described as a horizontal offset, as illustrated, instead of a straight connection as illustrated in FIG. 2.

In FIG. 5, the upper arm 17 of the clevis connection is manufactured in the identical manner as discussed with regard to FIGS. 1 through 4, except the bar member 10 is severed at the central offset at a predetermined angle measured relative to the free bar ends 12 and 13 in order to provide the angle of cut as indicated at 19 in FIG. 5. In this clevis end connection of FIG. 5, only the free end 13 is utilized, and the free end 12 (not shown in relation to the FIG. 5 embodiment), may be utilized as a clevis arm at the opposite end of the elongated piece of metal stock 20.

The bottom side 16 of the clevis end is formed from a piece of straight metal bar stock which is centrally severed at the same predetermined angle as illustrated in FIG. 5. This severed piece of offset stock 13 is aligned with the severed piece 16 of straight bar stock to form the bifurcated jaw having laterally spaced parallel side portions 16 and 17. With the offset of the severed piece of offset stock 13 converging to contact at 18 with the severed end of the severed piece of straight stock 16 with their surfaces 19 of severances aligned in a common inclined plane. Then the end 21 of elongated piece of metal stock 20 is butted up against surfaces 19 and welded in the same fashion. Thus, very simply and easily a clevis end connecting rod having offsets in one direction is manufactured.

Referring to FIG. 6, the manufacture of a similar offset connecting rod member is illustrated, but in this instance the connecting rod has bends or offsets in more than one direction, and the overall connecting rod has a complex offset or curvature, such that the elongated tubular member 20 progresses away from the clevis end 16 and 17 at a compound angle, or both in the vertical and horizontal directions. Here the finished clevis end is illustrated without annular weld 22 being filled in in order to better illustrate the complex angles involved.

Basically, the only difference between the manufacture of this clevis end connection and that illustrated in FIG. 5 is that the aligned severed surfaces 19 of flat stock 16 and offset stock 13 are not only angled in the horizontal direction as indicated in FIG. 3, but in addition they are also angled in the vertical direction. Thus, when end 21 of elongated piece of stock 20 is welded to surfaces 19 in FIG. 6, it extends away therefrom not only downwardly but away or into the Figure as viewed. This provides a complex offset in the finished connecting rod which is very easily manufactured.

Also, in order to provide maximum surface area 19 for welding at the severed end of offset metal stock piece 13, when the original piece of straight metal bar stock 10 is formed with a central offset, the transverse bends in the bar stock are made at the oblique or at an angle other than perpendicular. Note that the bends in bar stock 10 in FIG. 1 are normal transverse bends provided to form the offset 11. However, note when viewing the plan view of FIG. 6, the offset 11 is skewed outwardly such that the undersurface 25 is exposed to the plan view. This twisting is created by bending the original bar stock at oblique angles or angles other than right angles, and thus, when it is severed at its offset at the angle illustrated at 19 in FIG. 6, maximum welding surface area 19 is provided for welding the end of elongated stock 20 to surface 19.

I claim:

1. A method of manufacturing a metal rod connecting member, such as a railroad car brake rod, having at least one bifurcated clevis end with aligned transverse bores to receive a connecting pin therethrough, comprising the steps of, forming a piece of straight metal bar stock to provide parallel bar free ends extending off in opposite directions from a central transverse offset connecting member, said parallel free bar ends lying in different planes, transversely severing said bar stock at the central portion of said offset, realigning the severed bar ends with each other to form a bifurcated jaw having laterally spaced parallel side portions merging to contact at their offset ends, buting an end of an elongated piece of metal stock against the severed end surfaces of said severed bar ends, and welding said end of said elongated stock to said severed end surfaces.

2. The method of manufacturing a metal rod connecting member according to claim 1, including the step of forming at least one set of aligned bores through said bar ends either before or after the step of severing for receiving a common connecting pin therethrough.

3. The method of manufacturing a metal connecting member according to claim 2, including the step of annularly tapering said abutting end of said elongated piece of stock prior to welding to provide an annular welding relief between said abutting end and said severed end surfaces.

4. The method of manufacturing a metal connecting member according to claim 1, the step of transversely severing said bar stock characterized in that said bar stock is severed at the central portion of said offset on a plane perpendicular to the parallel free ends of said formed bar stock, and the step of realigning characterized in that the surfaces of severance of said offset ends are aligned to lie in a common plane.

5. A method of manufacturing a metal rod connecting member, such as a railroad car brake rod, having at least one bifurcated clevis end with aligned transverse bores for receiving a connecting pin therethrough, comprising the steps of, forming a piece of straight metal bar stock with a single central offset thereby providing parallel free bar ends extending off in opposite directions from said central offset, transversly severing said formed bar stock at a central portion of said offset at a predetermined angle measured relative to said free bar ends, severing a second piece of metal bar stock at the same said predetermined angle, aligning a severed piece of said offset stock with a severed piece of said second stock to form a bifurcated jaw having laterally spaced parallel side portions with the offset of said severed piece of said offset stock converging to contact the severed end of said severed piece of second stock with their surfaces of severance aligned such that they are lying in a common plane, butting an end of elongated piece of metal stock against said aligned severed end surfaces, and welding said end of said elongated stock to said aligned severed end surfaces.

6. The method of manufacturing a metal rod connecting member according to claim 5, including the step of forming at least one set of aligned bores through said bar ends of said bifurcated jaw either before or after the step of severing for receiving a common connecting pin therethrough.

7. The method of manufacturing a metal rod connecting member according to claim 6, including the step of annularly tapering said abutting end of said elongated piece of stock prior to welding to provide an annular welding relief between said abutting end and said aligned severed end surfaces.

8. The method of manufacturing a metal rod connecting member according to claim 5, wherein said second stock is straight.

9. The method of manufacturing a metal rod connecting member according to claim 5, including the step of forming a second bifurcated jaw in the same claimed fashion with the remaining severed pieces of offset and straight stock and welding the aligned severed ends thereof to the other end of said elongated piece of stock to form bifurcated clevis ends on opposite ends thereof.

10. The method of manufacturing a metal rod connecting member according to claim 5, said step of forming a piece of straight metal bar stock with a central offset including the step of forming said offset with parallel transverse bends in said bar stock at an angle other than perpendicular.

* * * * *